J. FROGGETT.
Hot Blast Apparatus for Furnaces.
No. 63,237.          Patented March 26, 1867.
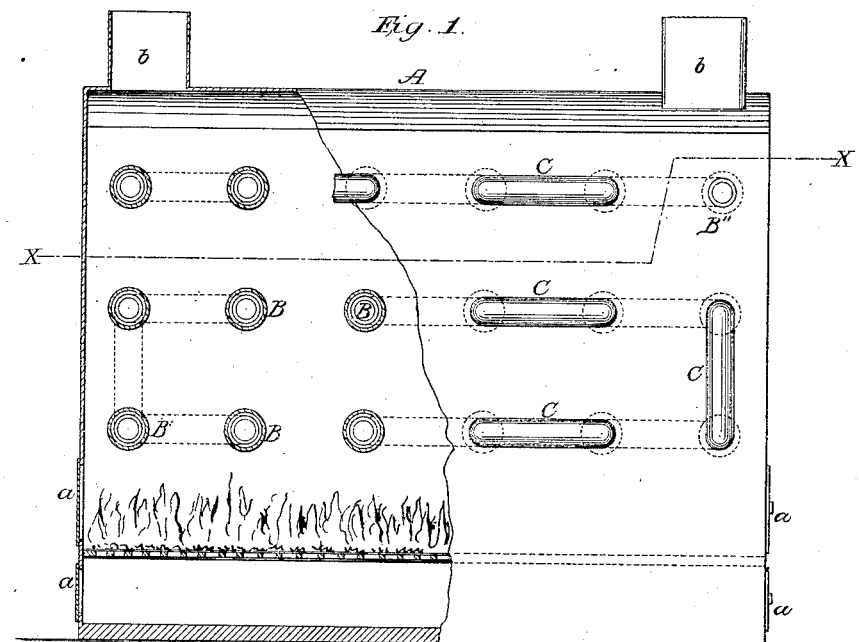
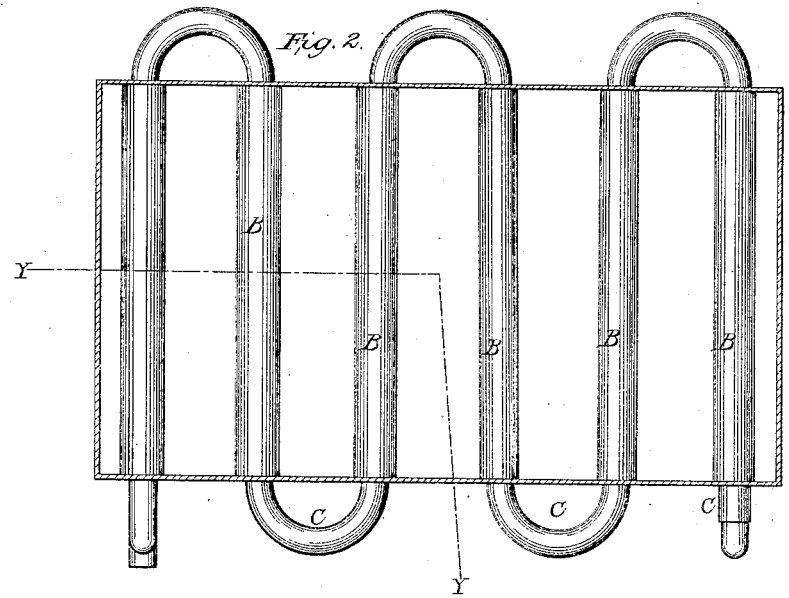

United States Patent Office.

JOB FROGGETT, OF YOUNGSTOWN, OHIO.

Letters Patent No. 63,237, dated March 26, 1867.

---

IMPROVEMENT IN HOT-BLAST APPARATUS FOR FURNACES.

---

*The Schedule referred to in these Letters Patent and making part of the same.*

---

TO ALL WHOM IT MAY CONCERN:

Be it known that I, JOB FROGGETT, of Youngstown, in the county of Mahoning, and State of Ohio, have invented a new and useful Improvement in Hot-Blast for Furnaces; and I do hereby declare that the following is a full, clear, and exact description thereof, which will enable others skilled in the art to make and use the same, reference being had to the accompanying drawings, forming part of this specification.

The object of my invention is to heat the air which is forced into furnaces and which is called the "blast," and the invention consists in providing a suitable chamber, in which the blast is heated to the required temperature in cylinders lying transversely across the chamber, or in any other equivalent position, and connected together on the outside of the chamber as will be hereinafter described.

Figure 1 represents a side elevation of my hot-blast chamber partly in section, showing the cylinders and the fire by which the blast is heated, in the sectional portion, and the connections on the outside in the other portion. The sectional portion is indicated by the line $y\ y$ of fig. 2.

Figure 2 is a horizontal section of fig. 1, through the line $x\ x$.

Similar letters of reference indicate like parts.

A represents the chamber, B the cylinders, and C the connections. The heating cylinders B are placed transversely across the chamber A in this example of my invention; they are placed in rows one above another as seen in the drawing. There are doors at each end of the chamber for the introduction of fuel, and removal of ashes, and chimney or tubes at the top for the discharge of the smoke. The doors are represented in the drawing by $a$, and $b$ represents the chimneys. The cylinders are attached to the sides of the chamber by air-tight joints, with caps covering the ends of the cylinders, each cap having an aperture to which are attached the connection pipes C. These connecting pipes are curved or circular in form as seen in fig. 2, and so attached to the cylinders that the joints and connection are entirely on the outside of the chamber, and consequently not exposed to the direct action of the fire. The cylinders are so connected that the whole series with their connections forms one continuous passage-way for the air. The air is thus exposed in its passage through the chamber to a very large heating surface, as will be observed by noticing that the air may enter one of the tubes in the lower tier at $B'$, fig. 1, and be discharged at $B''$ from the upper tier. I do not confine myself to the particular arrangement of the cylinders herein shown and described, nor to this particular manner of connecting them together. I am aware that both may be varied and the same or a similar result be obtained.

But having thus described my invention, what I do claim as new, and desire to secure by Letters Patent, is—

A hot-blast arrangement whereby the air is heated by passing through cylinders which are connected together on the outside of the heating chamber, substantially as herein shown and described.

JOB FROGGETT.

Witnesses:
 JOSEPH H. BROWN,
 W. SCOTT BONNELL.